(12) United States Patent  (10) Patent No.: US 8,463,305 B2
Klassen et al.  (45) Date of Patent: Jun. 11, 2013

(54) MESSAGING PROTOCOL/SERVICE SWITCHING METHODS AND DEVICES

(75) Inventors: Gerhard Dietrich Klassen, Waterloo (CA); Shaul S. Wisebourt, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/461,077

(22) Filed: May 1, 2012

(65) Prior Publication Data

US 2012/0220321 A1  Aug. 30, 2012

Related U.S. Application Data

(63) Continuation of application No. 12/328,362, filed on Dec. 4, 2008, now Pat. No. 8,175,625, which is a continuation of application No. 11/008,956, filed on Dec. 13, 2004, now Pat. No. 7,477,908.

(51) Int. Cl.
*H04W 4/14*  (2009.01)

(52) U.S. Cl.
USPC .......................................... 455/466; 455/424

(58) Field of Classification Search
USPC ............. 455/412.2, 414.1, 432.1, 432.2, 433, 455/435.1, 558, 466, 456.1, 410, 411
See application file for complete search history.

(56) References Cited

U.S. PATENT DOCUMENTS

| | | |
|---|---|---|
| 6,292,895 B1 | 9/2001 | Baltzley |
| 6,370,250 B1 | 4/2002 | Stein |
| 6,608,637 B1 | 8/2003 | Beaton et al. |
| 6,665,709 B1 | 12/2003 | Barron |
| 6,959,194 B2 | 10/2005 | Brouwer et al. |
| 7,196,807 B2 | 3/2007 | Goldstone |
| 7,640,427 B2 | 12/2009 | Callas et al. |
| 2001/0014158 A1 | 8/2001 | Baltzley |
| 2002/0007453 A1 | 1/2002 | Nemovicher |
| 2002/0094089 A1 | 7/2002 | Kamiya et al. |
| 2003/0070070 A1 | 4/2003 | Yeager et al. |
| 2004/0088369 A1 | 5/2004 | Yeager et al. |
| 2004/0137899 A1 | 7/2004 | Hartmaier |
| 2004/0202327 A1 | 10/2004 | Little et al. |
| 2004/0205248 A1 | 10/2004 | Little et al. |
| 2005/0033963 A1 | 2/2005 | Ronchi et al. |

(Continued)

FOREIGN PATENT DOCUMENTS

| | | |
|---|---|---|
| CA | 2702780 | 11/2009 |
| DE | 101 27 360 A1 | 12/2002 |

(Continued)

OTHER PUBLICATIONS

Digital Cellular Telecommunications System (Phase 2+); Universal Mobile Telecommunications System (UMTS); Security Mechanisms for the (U)SIM application toolkit; Stage 2 (3GPP TS 23.048 version 5.7.0 Release 5); ETSI TS 123 048. ETSI Standards, European Telecommunications Standards Institute, Sophia-Antipo, FR, vol. 3-T3, No. V570, Jun. 2003 XP014007531.

(Continued)

*Primary Examiner* — Sam Bhattacharya

(74) *Attorney, Agent, or Firm* — Jones Day

(57) ABSTRACT

Methods, devices, and computer readable media for switching communications from a first messaging protocol/service to a second messaging protocol/service by use of messaging information being embedded in a header of a first message of the first messaging protocol/service to enable the recipient to contact the sender over the second messaging protocol/service, is provided.

15 Claims, 3 Drawing Sheets

U.S. PATENT DOCUMENTS

| | | |
|---|---|---|
| 2005/0058094 A1 | 3/2005 | Lazaridis et al. |
| 2005/0235148 A1 | 10/2005 | Scheidt et al. |
| 2006/0045110 A1 | 3/2006 | Miura et al. |
| 2006/0230459 A1 | 10/2006 | Lam |
| 2006/0282847 A1 | 12/2006 | Gupte |
| 2006/0294377 A1 | 12/2006 | Ho et al. |
| 2007/0100913 A1 | 5/2007 | Sumner et al. |
| 2007/0124751 A1 | 5/2007 | Le Fevre et al. |
| 2007/0143824 A1 | 6/2007 | Shahbazi |
| 2010/0031054 A1 | 2/2010 | Starr et al. |

FOREIGN PATENT DOCUMENTS

| | | |
|---|---|---|
| EP | 1291748 A2 | 3/2003 |
| EP | 1670195 A1 | 6/2006 |
| JP | 11-68828 | 3/1999 |
| WO | 97/08870 A2 | 3/1997 |
| WO | 03/007184 A1 | 1/2003 |
| WO | 2007/071041 A1 | 6/2007 |
| WO | 2009/137927 A1 | 11/2009 |

OTHER PUBLICATIONS

Harjula, E., et al.; Plug-And-Play Application Platform; Towards Mobile Peer-to-Peer, MUM 2004, Oct. 27, 2004, pp. 63-69, XP002326464.

USPTO: Office Action from corresponding U.S. Appl. No. 13/461,084 dated Sep. 17, 2012 (7 pages).

Extended European Search Report from EP patent application No. 09745342.7 dated Oct. 17, 2011 (7 pages).

Gutmann, P.: "Password-based Encryption for CMS," Request for Comments: 3211; Internet Engineering Task Force, IETF, Dec. 2001 (18 pages), XP015008990.

Office Action issued for corresponding Chinese patent application No. 200980100969.3 (Chinese and English translation), Dec. 31, 2011 (17 pages).

International Preliminary Report, Application No. PCT/CA2009/000657, dated Nov. 25, 2010 (7 pages).

Written Opinion and International Preliminary Report, Application No. PCT/CA2009/000657, dated Jul. 27, 2009 (10 pages).

Response filed for EP patent application No. 09745342.7 dated May 3, 2012 (22 pages).

MESSAGING PROTOCOL/SERVICE SWITCHING METHODS AND DEVICES

CROSS-REFERENCE TO RELATED APPLICATIONS

This is a continuation of U.S. application. Ser. No. 12/328362, filed Dec. 4, 2008, which is a continuation of U.S. application. Ser. No. 11/008956, filed Dec. 13, 2004, now U.S. Pat. No. 7,477,908, both of the above applications hereby incorporated herein by reference.

TECHNICAL FIELD

The technology disclosed in this application relates to messaging services and protocols.

BACKGROUND

Modern devices are capable of messaging using a number of known messaging protocols and services. Some protocols/services have certain weaknesses such as cost and unreliability. Some are considered relatively slow and may be network specific.

One existing messaging protocol/service is the SMS (short message service) protocol/service which is often used in cellular type services to relay short messages. Although SMS is a relatively widespread means of messaging communication, unfortunately it has the aforesaid weaknesses. Use of SMS services not only can cost a user a non-negligible amount per message, resulting in relatively hefty costs per month or per year, but also suffers from a relatively frequent loss of messages sent by users.

It is noted that Short Message Service (SMS) usually refers to wireless alphanumeric text messages sent to a PCS telephone. The GSM protocol is, as yet, the only protocol to support text responses from a PCS telephone. Several competing protocols support the receiving of these messages but not the transmitting, or the responding back to the sender. The supporters of these other protocols are now adding on the ability to initiate or respond to text messages. Some other existing protocols may not be as susceptible to reliability problems and are not as costly, however, they may not be as widespread as SMS. For example, there are peer to peer (P2P) protocols that allow one device to communicate with another device without any server/message center interference. Such services may allow messages to be sent with high speed and reliability regardless of the type of network that the devices are running on. Specific examples of such a peer to peer protocols include PIN2PIN.

Existing user devices now have the ability to be used to communicate with different media and over various communication protocols/services depending upon choices made by the user of the device. A common practice utilized in communication is to answer a message of a communications session using the same media and communication protocol as the original message. Consistent with this is the often included device feature of "reply" which enables the recipient of a message to reply to the sender of the message in the same media and over the same communication protocol/service as the original message.

SUMMARY

Methods, devices, and computer readable media are provided for switching communications from a first messaging protocol to a second messaging protocol by use of messaging information being embedded in a header of a first message of the first messaging protocol to enable the recipient to contact the sender over the second messaging protocol.

According to one broad aspect, the invention provides a method of switching from SMS messaging to P2P messaging for communications between a first user device and a second user device, the method comprising: communicating an SMS message having a user data header (UDH) including messaging information for P2P messaging; and switching to P2P messaging using the messaging information after the communicating of the SMS message.

In some embodiments, the method for execution by the first user device, wherein: said communicating comprises sending the SMS message from the first user device; and said switching to P2P messaging comprises receiving a P2P message at the first user device and thereafter communicating using P2P messaging.

In some embodiments, the method for execution by the second user device wherein: said communicating comprises receiving the SMS message at the second user device; and said switching to P2P messaging comprises extracting the messaging information and transmitting a message using P2P at the second user device and thereafter communicating using P2P messaging in accordance with the messaging information.

In some embodiments, the method for execution by the first user device and the second user device, wherein: said communicating comprises: a) sending the SMS message from the first user device to the second user device; b) receiving the SMS message at the second user device; said switching to P2P messaging comprises: c) extracting the messaging information and sending the message using P2P from the second user device to the first user device in accordance with the messaging information; and d) receiving the message using P2P at the first user device.

In some embodiments, a method further comprises before communicating: determining from predetermined messaging protocol/service options whether messaging between the first user device and the second user device is permitted to be switched from SMS messaging to P2P messaging.

In some embodiments, the messaging information comprises a P1N number for use in P2P messaging.

According to another broad aspect, the invention provides a user device adapted to switch from SMS messaging to P2P messaging for communications with another user device by communicating an SMS message having a user data header (UDH) including messaging information for P2P messaging, and switching to P2P messaging using the messaging information for P2P messaging after the communicating of the SMS message.

In some embodiments, the user device comprises: a receiver for receiving the SMS message from the another user device, the user data header (UDH) of the SMS message including messaging information for P2P messaging with the another user device; a processing function for obtaining the messaging information from the UDH of the SMS message; a transmitter for transmitting a message using P2P with use of the messaging information to the another user device, thereby switching to P2P messaging.

In some embodiments, the processing function is further adapted to determine from predetermined messaging protocol/service options whether messaging between the user device and the another user device is permitted to be switched from SMS messaging to P2P messaging.

In some embodiments, the user device comprises: a transmitter for transmitting the SMS message to the another user device, the user data header (UDH) of the SMS message including messaging information for P2P messaging with the another user device; a receiver for receiving a message using P2P from the another user device, thereby switching to P2P messaging.

In some embodiments, the user device comprises a transmitter, a receiver and a processing function, wherein: the user device is adapted to initiate switching to P2P messaging by: a) sending the SMS message to the another user device; b) receiving a message using P2P from the another user device thereby switching to the P2P protocol; the user device is adapted to switch protocol upon initiation by another user device by: c) receiving the SMS message from the another user device; and d) sending a message using P2P to the another user device thereby switching to the P2P protocol.

In some embodiments, the messaging information comprises a P1N number for use in P2P messaging with the another user device.

According to another broad aspect, the invention provides a computer readable medium comprising stored instructions for execution at a first user device, the instructions implementing a method of switching from SMS messaging to P2P messaging for communications between the first user device and a second user device, the method comprising: communicating an SMS message having a user data header (UDH) including messaging information for P2P messaging; and switching to P2P messaging using the messaging information after the communicating of the SMS message.

In some embodiments, said communicating comprises sending the SMS message from the first user device; and said switching to P2P messaging comprises receiving a message using P2P at the first user device and thereafter communicating using P2P messaging.

In some embodiments, said communicating comprises receiving the SMS message at the second user device; and said switching to P2P messaging comprises transmitting a message using P2P at the second user device and thereafter communicating using P2P messaging.

In some embodiments, said communicating comprises: a) sending the SMS message from the first user device to the second user device; b) receiving the SMS message at the second user device; said switching to P2P messaging comprises: c) sending a message using P2P from the second user device to the first user device; and d) receiving the message using P2P at the first user device.

In some embodiments, switching comprises: the second user device obtaining the messaging information from the UDH of the SMS message; and initiating P2P messaging between the first user device and the second user device with use of the messaging information.

In some embodiments, the method further comprises before communicating: determining from predetermined messaging protocol/service options whether messaging between the first user device and the second user device is permitted to be switched from SMS messaging to P2P messaging.

In some embodiments, the messaging information comprises a P1N number for use in P2P messaging.

Other aspects and features will become apparent to those of ordinary skill in the art upon review of the following description of specific embodiments in conjunction with the accompanying figures.

BRIEF DESCRIPTION OF THE DRAWINGS

Preferred embodiments will now be described with reference to the accompanying diagrams, in which.

DETAILED DESCRIPTION

Even though there are varying considerations of cost efficiency, reliability, and popularity of a communications protocol, sometimes the actual chosen communication protocol may be initially used simply because the protocol is more widespread. For example, cell phone numbers which enable regular cell phone and SMS services are commonly exchanged to effect communication. Some devices however may have alternate methods of communication, which may be preferable. In some cases, both devices are capable of communication over a more preferable protocol, but unfortunately neither user is aware of the capabilities of the other user's device.

Such a situation may arise when for example, both user's are utilizing devices that support a P2P protocol requiring a PIN (personal identification number) that identifies a particular device rather than a person. For example, in a first case, a user initiating conversation may not know that a second user has a P2P capable device. In another case, a user of a first device may be aware of the second user's device capability, but does not know the PIN of the second user's device. This might occur for example when a user changes their device, but keeps the same phone number (for example as would occur if a SIM card is moved to another P2P enabled device).

One solution to this situation provided by some embodiments in this application that is specific to dealing with switching between the SMS protocol and a peer to peer protocol requiring a PIN is to embed a user device's PIN number in an SMS user data header (UDH) when an initial SMS message is sent, the embedding of the user device's PIN being transparent to the user. The receiving device is configured to check any incoming initial SMS message for this PIN embedded in the UDH. As in the case of the sending device, the receiving device performs this operation transparent to the user. Once the receiving side has detected a PIN number in the header of the initial SMS message it switches to P2P messaging right away, assuming it is able to do so. The sending device once entering the P2P session will, instead of sending SMS messages and embedding PIN numbers in their headers, will simply continue communication over P2P. In some implementations, P2P messaging and SMS messaging have similar conversation-like user interfaces (UIs) and as such protocol/service switching of this kind can occur absolutely transparently to the user.

Although it may be preferable to switch between messaging protocol/services at the beginning of messaging communications, a switch between messaging protocol/services may be conducted at any time during a messaging communications session.

In general two devices may switch between any first and second messaging protocol/service by including in a header of a message sent, communication information for communicating with the sender using a different messaging protocol/service.

Figure 1:
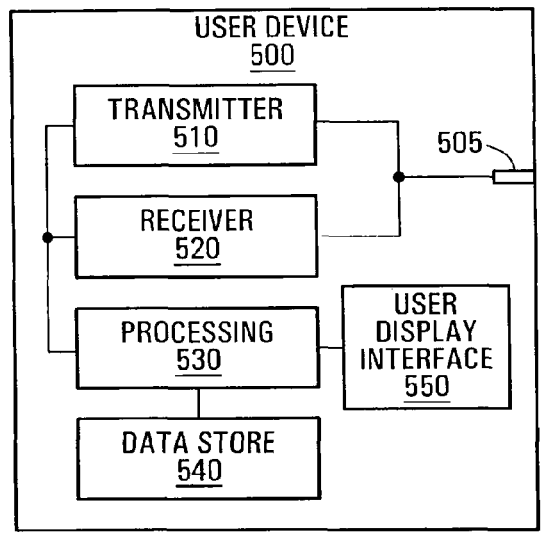
FIG. 1 is a block diagram of a device adapted to perform messaging protocol/service switching according to one embodiment.

Referring to FIG. 1, a device adapted to perform messaging protocol/service switching according to one embodiment will now be discussed. The device is capable of communicating with other devices using at least a first service/protocol and a second service/protocol. User device 500 has a transmitter 510, a receiver 520, an antenna 505, processing 530, a user display interface 550, and a data store 540. These basic elements will be described below in respect of their function within the method and functionality of the embodiments. The transmitter 510 and receiver 520 function to transmit and receive through antenna 505 over-the-air (OTA) signals, which in the present embodiments comprise short messages. Other signals may also be received. Processing 530, functions to retrieve any data from the data store 540 required to assist it in extracting and embedding messaging information (addresses or identification) respectively out of and into the header of the first message of the first messaging protocol/service. This could include any information identifying the device ID according to a messaging protocol/service, and information for recognizing device ID's of other messaging protocol/services the device is capable of communicating with. The data store 540 may also contain messaging rules or options for use in determining whether or not messaging protocol/service switching is to be permitted. These may have been preset upon manufacture or initialization of the functioning of the user device or may be set by a user through use of a user display interface 550. Once the messaging options if any have been set, the user device will behave in accordance thereto completely transparent to the user, and not requiring any real time input from the user.

It should be understood that the particulars of the user device shown in FIG. 1 are for the purpose of example only. In particular, it should also be understood that the particular configuration and connections between the elements shown in FIG. 1 form only one example implementation. Elements can be combined or separated into additional elements. Each element may also be embodied in whole or in part or in any combination thereof, in hardware, software, firmware. Furthermore, separate hardware and/or software may be used to implement each of the different services/protocols, or there may be partial or complete overlap between the hardware and/or software used to implement the different services/protocols.

Figure 2:
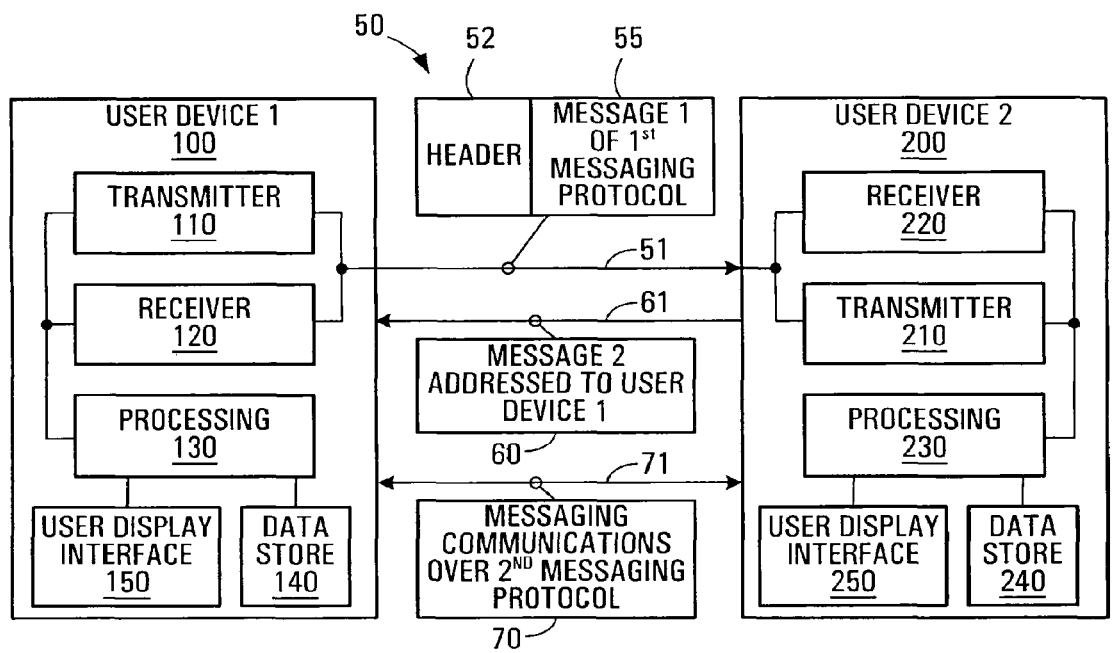
FIG. 2 is a block diagram of two devices performing messaging protocol/service switching according to one embodiment.

Referring now to FIG. 2, two devices performing messaging protocol/service switching according to one embodiment will now be discussed.

User device1 100 and user device2 200 are each capable of messaging over a first and second messaging protocol/service. Each has a transmitter (110, 210), a receiver (120, 220), processing (130, 230), and a data store (140, 240).

In the event that the user of user device1 100 initiates messaging with user or user device2 200, a first message 50 of the first protocol/service is to be sent 51 to user device2 200. User device1 determines if messaging protocol/service switching is to be initiated. If so, the message includes the text message 55 of the first messaging protocol/service, and a header 50 of the first messaging protocol/service. The header 50 contains messaging information for use in messaging the user device1 100 over the second messaging protocol/service.

User device2 200 functions to receive the first message 50 sent 51 from the user device1 100. User device2 200 determines if messaging protocol/service switching is to be permitted. If so, when the first message 50 is received, the user device2 200 obtains the messaging information in the header 52 of the first message 50. The messaging information enables the user device2 200 to message the user device1 100 using the second messaging protocol/service. Hence, user device2 200 transmits 61 a second message 60 over a second messaging protocol/service to user device1 100 with use of the messaging information. Once user device1 100 receives the second message 60 in the second messaging protocol/service, the user device1 100 no longer sends messages of the first protocol/service to user device2 200, but instead cooperates to establish messaging communications 71 over the second messaging protocol/service 70.

Figure 3:
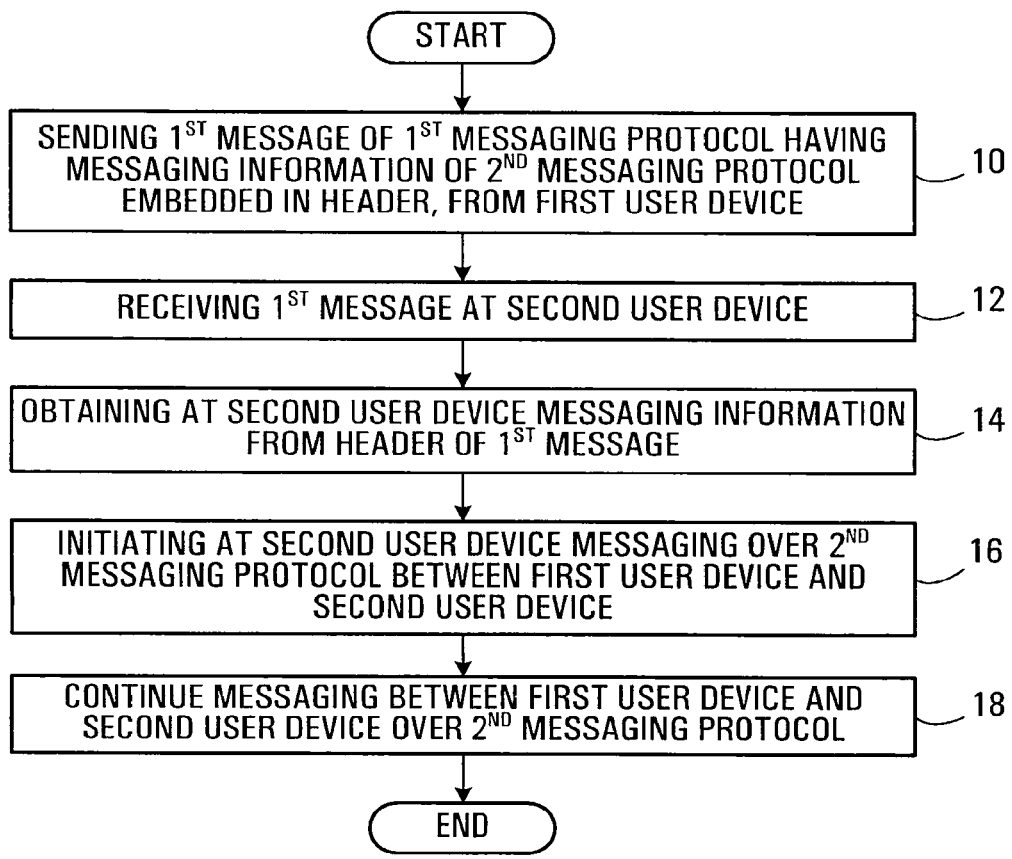
FIG. 3 is a flow diagram of steps performed by a pair of devices performing messaging protocol/service switching according to one embodiment.

Referring to FIG. 3, the steps performed by a pair of devices performing messaging protocol/service switching according to one embodiment will now be described.

In this embodiment, a first user device sends a first message whose header is embedded with messaging information at step 10. The messaging information is information which can be used to contact the first user device over a second messaging protocol/service.

At step 12, a second user device receives the first message. After receiving the first message, the first user device obtains the messaging information from the header of the first message at step 14.

At step 16, the second user device initiates messaging over the second messaging protocol/service with the first user device, and at step 18 messaging is continued with the first user device over the second messaging protocol/service.

In one specific embodiment, the first messaging protocol/service is SMS and the first message is an SMS message. The second messaging protocol/service is a peer-to-peer messaging service. In an example implementation, the messaging information to enable messaging with the first user device, is the PIN of the first user device, and this PIN is embedded in the UDH (user data header) of the first message. The result is the switching from SMS communication to P2P communication, transparent to both users. However, more generally, the messaging information is any information sent using a first protocol that is necessary to allow the second user device to contact the first user device using a second protocol/service.

Figure 4:
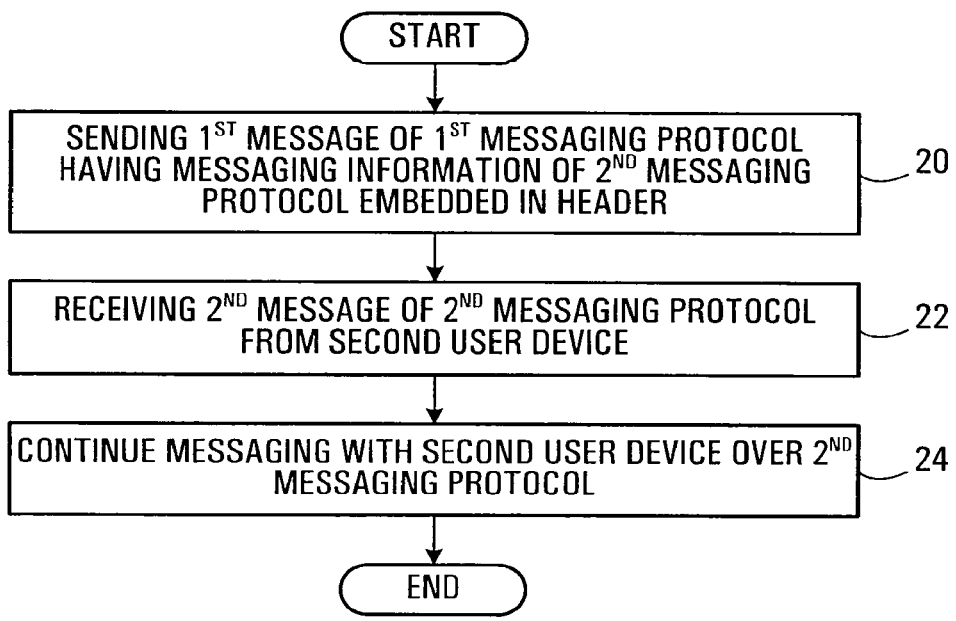
FIG. 4 is a flow diagram of steps performed by a user device sending a message over a first messaging protocol/service which initiates messaging protocol/service switching according to one embodiment.

Referring to FIG. 4, the steps performed by a user device sending a message over a first messaging protocol/service which initiates messaging protocol/service switching according to one embodiment will now be discussed. The first user device sends a first message of a first messaging protocol/service in step 20. The header of the first message contains messaging information which is for communicating with the user device over a second messaging protocol/service.

In step 22, the user device receives a second message which has originated at a second user device and which is of a second messaging protocol/service. This reflects the fact that the second user device has begun communications in accordance with a switch of protocol/service.

Finally, in step 24, the first user device continues to perform messaging with the second user device over the second messaging protocol/service.

Figure 5:
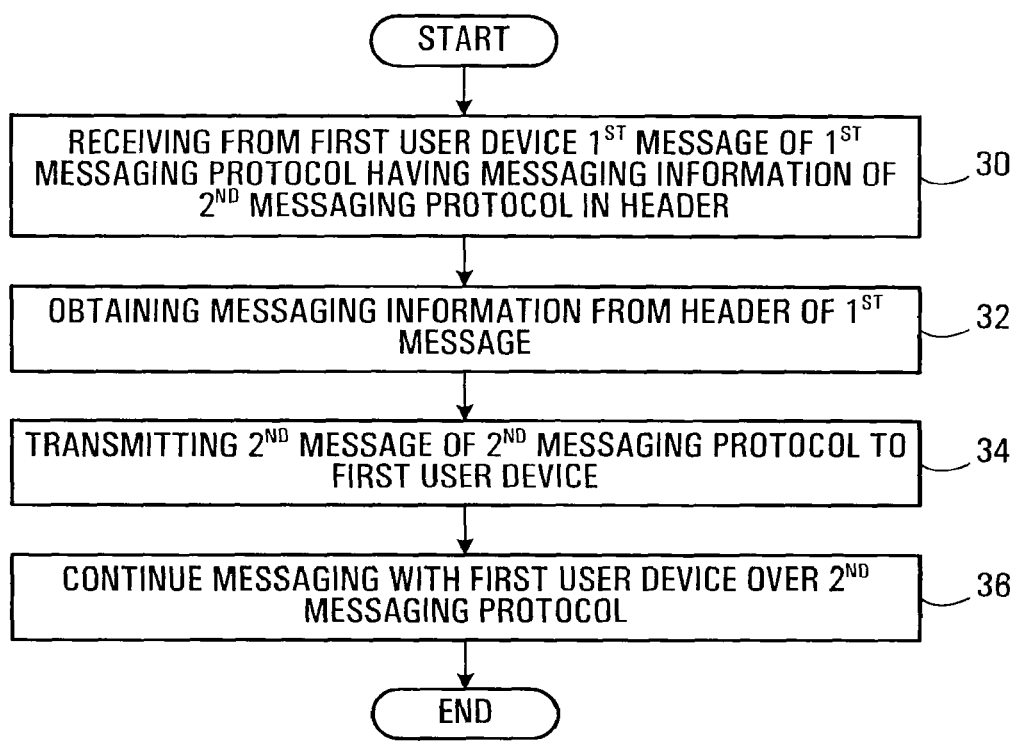
FIG. 5 is a flow diagram of steps performed by a user device receiving a message over a first messaging protocol/service which initiates messaging protocol/service switching according to one embodiment.

Referring to FIG. 5, the steps performed by a user device receiving a message over a first messaging protocol/service which initiates messaging protocol/service switching according to one embodiment will now be discussed.

At step 30, a second user device receives a first message of a first messaging protocol/service from a first user device. In the header of the first message is messaging information for use in contacting the first user device over a second messaging protocol/service.

At step 32, the messaging information is obtained from the header of the first message, and with use of this information at step 34, the second user device transmits a second message in a second messaging protocol/service to the first user device.

At step 36, thereafter for the remainder of messaging, the second user device and the first user device utilize the second messaging protocol/service.

Preferably, the functionality of FIG. 4 and FIG. 5 may be carried out by a single user device configured to act as a transmitter which initiates the messaging protocol/service switch or the receiver which responds to the messaging protocol/service switch.

As mentioned herein above, variations of the solution can include messaging options stored at a user device (in the specific embodiments discussed this could be SMS options) for allowing the user before hand to define the default transparent behavior of the user device, as to whether or not communication information (which here is a PIN number) is to be sent in a header (for example an SMS user data header), and conversely whether to allow switching to the other form of messaging (P2P messaging) upon receipt of a message of a first protocol/service with connection information of a second protocol/service embedded in the header of the message of the first protocol/service (for example an SMS message with a PIN embedded in the UDH). These options therefor function to determine when the messaging protocol/service switching is to be performed, and when no messaging protocol/service switching is to be performed (regular known messaging is executed).

Many users would consider it an advantage to use a device having this capability over other mobile devices because of the opportunity to automatically save on per message costs such as that charged for SMS messages. Taking into account a growing number of devices which can communicate using different messaging protocol/services, users will be able to save money while guaranteeing full, transparent, fast, reliable and flexible functionality.

The specific examples have focussed on switching between a first messaging protocol that is SMS messaging and a second messaging protocol that is peer-to-peer messaging. More generally, embodiments are applicable to automate the switching between any two selected messaging protocols. Other messaging protocol examples include MMS (multimedia messaging service), email. MMS is a new standard in mobile messaging. Like SMS, MMS is a way to send a message from one mobile to another. The difference is that MMS can include not just text, but also sound, images and video. It is also possible to send MMS messages from a mobile phone to an email address.

In a preferred embodiment, a pair of devices communicating using a first one of these protocols (or some other messaging protocol or some other messaging protocol not specifically listed) will automatically attempt to switch to a second of these protocols (or some other messaging protocol not specifically listed) that is less expensive than the first protocol. If two devices each support respective sets of protocols, preferably the end result is that a switch is made to a less expensive protocol that both devices support. In some embodiments, the switch is made to the least expensive protocol that both devices support. For example, other peer to peer protocols may be supported that are less expensive than SMS. Examples of particular switches that may result in reducing expense are switches from SMS to email, switch from MMS to email, switch from SMS or MMS to another less expensive peer to peer protocol.

Alternatively, a switch in protocols to one that is more reliable may be made. Alternatively, a switch to a protocol that optimizes a combination of expense and reliability is made.

Another embodiment provides computer media comprising instructions for a processor of a device such as those described hereinabove, to carry out the functionality for messaging protocol/service switching such as that described herein above.

Numerous modifications and variations are possible in light of the above teachings. It is therefore to be understood that within the scope of the appended claims, what is disclosed in accordance with the application may be practiced otherwise than as specifically described herein.

The invention claimed is:

1. A method of switching a mode of communication from a first messaging protocol to a second messaging protocol for communications between a first user device and a second user device, the method comprising:

communicating a first message containing messaging information for the second messaging protocol, by the first user device to the second user device using the first messaging protocol; and using the messaging information, after the communicating of the first message, to switch the mode of communication to the second messaging protocol when at least one of the first user device and the second user device communicates one or more subsequent messages.

2. The method of claim 1, wherein:

said communicating comprises sending the first message from the first user device; and said switching the mode of communication to the second messaging protocol comprises receiving a second message of the second protocol at the first user device and thereafter communicating using the second messaging protocol.

3. The method of claim 1, wherein:

said communicating comprises receiving the first message at the second user device; and said switching the mode of communication to the second messaging protocol comprises extracting the messaging information and transmitting a second message using the second messaging protocol at the second user device and thereafter communicating using the second messaging protocol in accordance with the messaging information.

4. A method of claim 1 further comprising before communicating:

determining from predetermined messaging options whether messaging between the first user device and the second user device is permitted to be switched from the first messaging protocol to the second messaging protocol.

5. The method of claim 1, wherein the first messaging protocol comprises a short message service (SMS) protocol, and the second messaging protocol comprises a peer to peer (P2P) messaging protocol.

6. The method of claim 5, wherein the peer to peer messaging protocol is an email protocol.

7. The method of claim 1, wherein the messaging information is in a user data header of the first message.

8. The method of claim 1, wherein the messaging information comprises a personal identification number for use in peer to peer messaging.

9. The method of claim 1, wherein the second messaging protocol is automatically selected by the first user device from a set of one or more possible messaging protocols using at least one of expense and reliability as a selection criteria.

10. The method of claim 1, wherein the communicating and switching takes place automatically and transparent to users of the first and second user devices.

11. The method of claim 1, wherein the messaging information includes information identifying a device identifier (ID) of the first user device according to other messaging protocols for which the second user device is capable of communicating.

12. A user device comprising:
a receiver configured to receive messages;
a transmitter configured to send messages; and
a processor communicatively coupled to the receiver and the transmitter, the processor configured to:
communicate a first message containing messaging information for a second messaging protocol, using the first messaging protocol; and
using the messaging information for the second messaging protocol, after communicating the first message, to switch to the second messaging protocol when the transmitter is sending one or more subsequent messages.

13. A computer readable medium comprising stored instructions for execution at a first user device, the instructions implementing a method of switching a mode of communication from a first messaging protocol to a second messaging protocol for communications between the first user device and a second user device, the method comprising:
communicating a first message containing messaging information for the second messaging protocol, using the first messaging protocol; and
using the messaging information, after communicating the first message, to switch the mode of communication to the second messaging protocol when at least one of the first user device and the second user device communicates one or more subsequent messages.

14. A method of switching a mode of communication from a first messaging protocol to a second messaging protocol, the method comprising:
communicating a first message according to the first messaging protocol, the first message containing messaging information for the second messaging protocol; and
using the messaging information to communicate a subsequent message according to the second messaging protocol.

15. The method of claim 14, wherein the messaging information is used to communicate a subsequent message according to the second messaging protocol in response to the second messaging protocol becoming preferable to the first messaging protocol.

* * * * *